(12) United States Patent
Wilcher

(10) Patent No.: US 6,305,555 B1
(45) Date of Patent: Oct. 23, 2001

(54) WEAR SHOE FOR SLUDGE COLLECTOR

(75) Inventor: Stephen B. Wilcher, Harleysville, PA (US)

(73) Assignee: United States Filter Corporation, Palm Desert, CA (US)

(*) Notice: Subject to any disclaimer, the term of this patent is extended or adjusted under 35 U.S.C. 154(b) by 0 days.

(21) Appl. No.: 09/540,573

(22) Filed: Mar. 31, 2000

(51) Int. Cl.[7] .................................................. B01D 21/18
(52) U.S. Cl. .......................... 210/525; 210/526; 210/541; 198/721; 198/731
(58) Field of Search ..................... 210/803, 525, 210/526, 541, 542; 198/721, 728, 731

(56) References Cited

U.S. PATENT DOCUMENTS

| Re. 35,676 | 12/1997 | Wilcher . | |
|---|---|---|---|
| 3,140,774 | * 7/1964 | Johnston et al. | 210/526 |
| 3,313,422 | 4/1967 | Swenson . | |
| 3,394,816 | * 7/1968 | Lowry | 210/526 |
| 4,576,277 | 3/1986 | Park et al. . | |
| 4,585,116 | 4/1986 | Albrecht . | |
| 4,640,410 | 2/1987 | Palmaer et al. . | |
| 4,663,042 | 5/1987 | Rasper et al. . | |
| 5,361,892 | 11/1994 | Hamaker et al. . | |
| 5,398,805 | 3/1995 | Esposito et al. . | |
| 5,511,649 | 4/1996 | Wilcher . | |
| 5,620,601 | * 4/1997 | Wilcher et al. | 210/526 |
| 5,725,084 | 3/1998 | Jager . | |
| 5,806,658 | 9/1998 | Hannum . | |
| 5,857,560 | 1/1999 | Bjorkholm . | |
| 5,885,458 | * 3/1999 | Wilcher et al. | 210/541 |
| 5,888,158 | 3/1999 | Wilcher . | |

* cited by examiner

Primary Examiner—Christopher Upton
(74) Attorney, Agent, or Firm—Michael Best & Friedrich LLP

(57) ABSTRACT

A wear shoe for mounting to a flight of a sludge collector. The wear shoe snaps into a surface of the flight at a desired location and is held in place with no additional fasteners or hardware. The wear shoe is able to be utilized with any channel-type flight configuration.

5 Claims, 3 Drawing Sheets

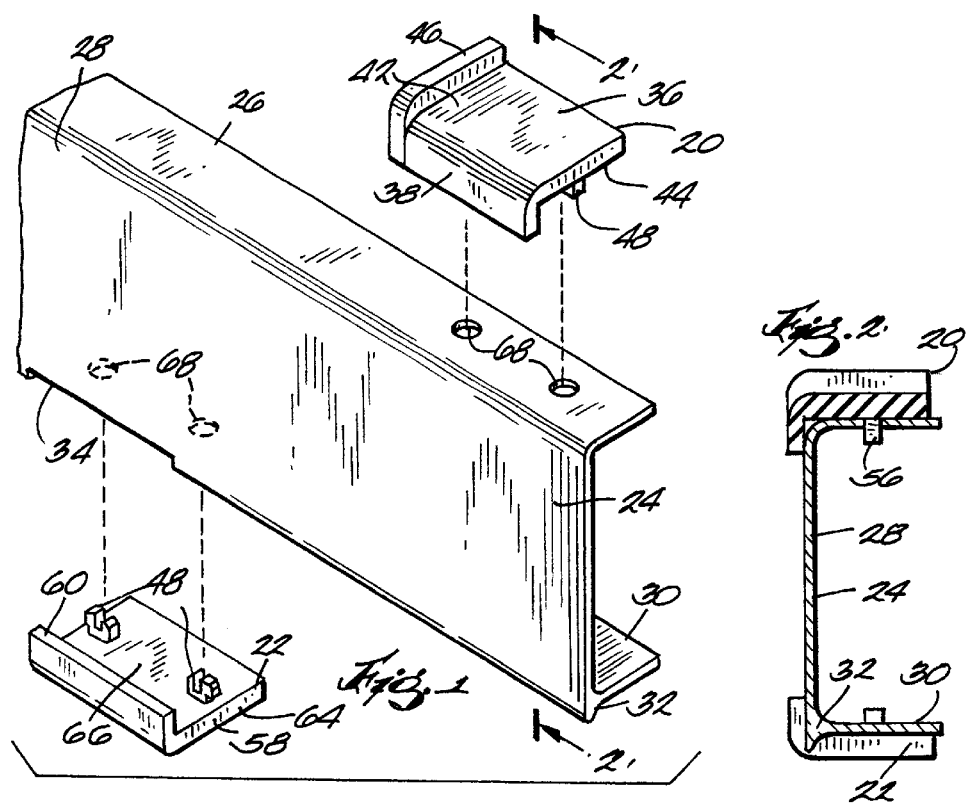
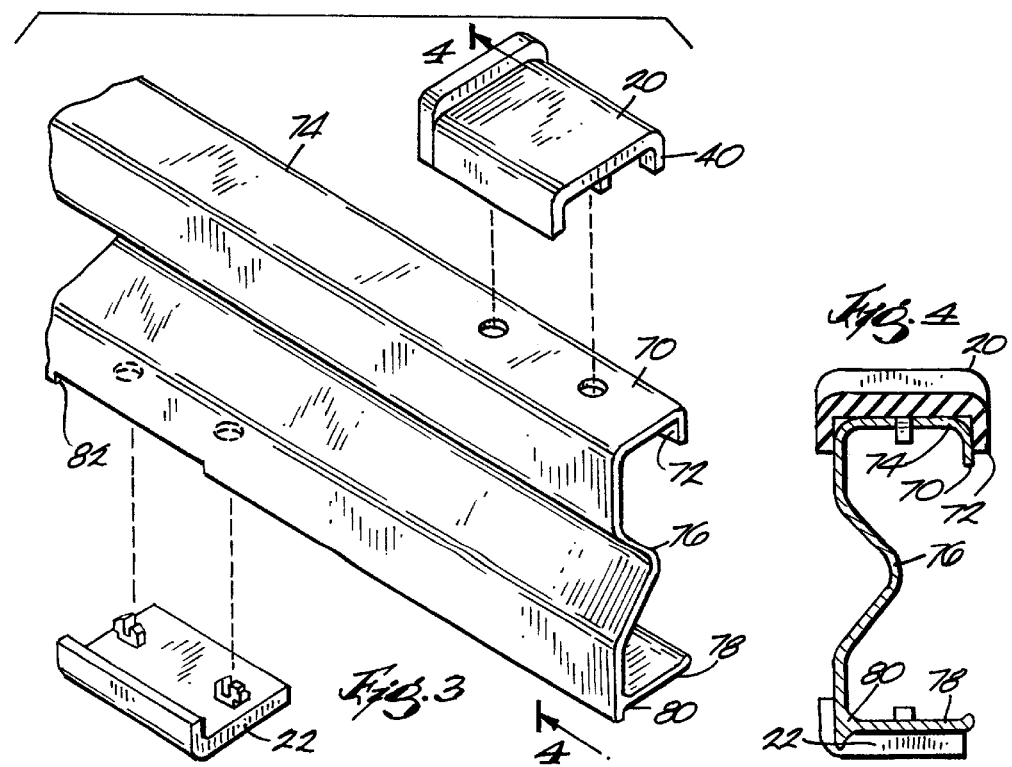

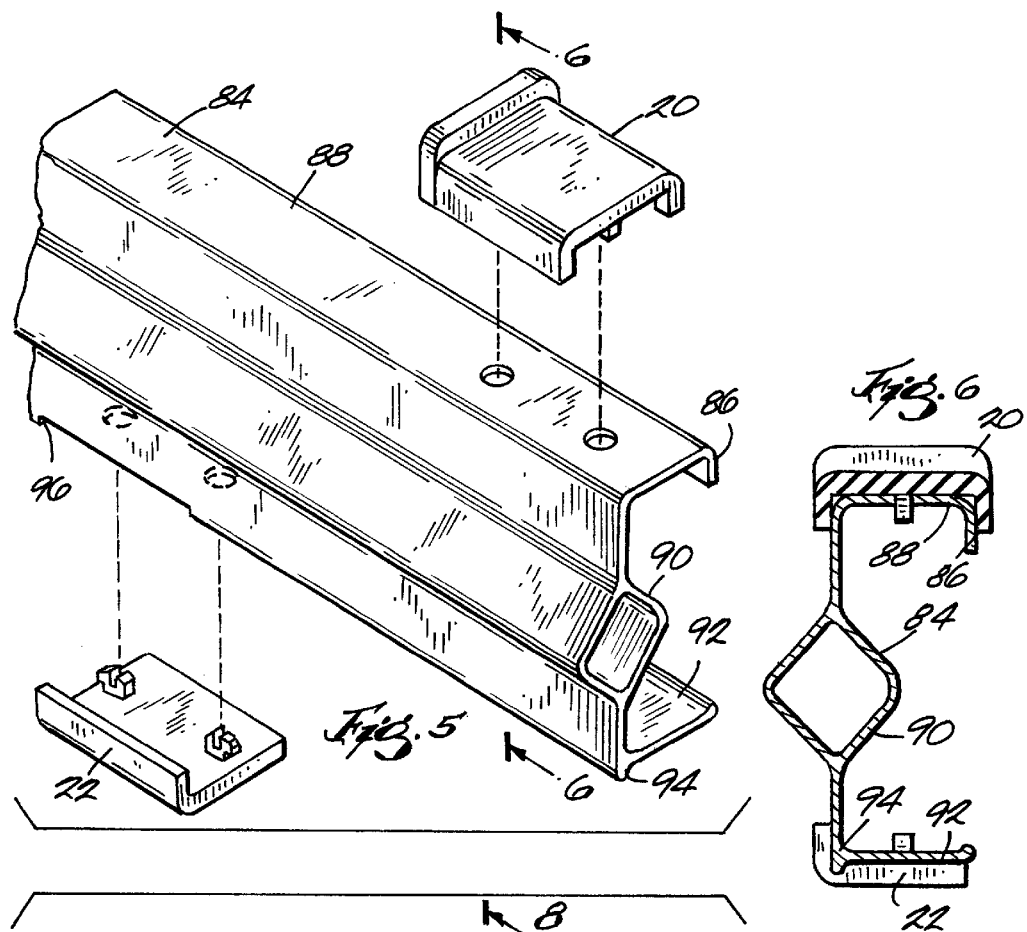
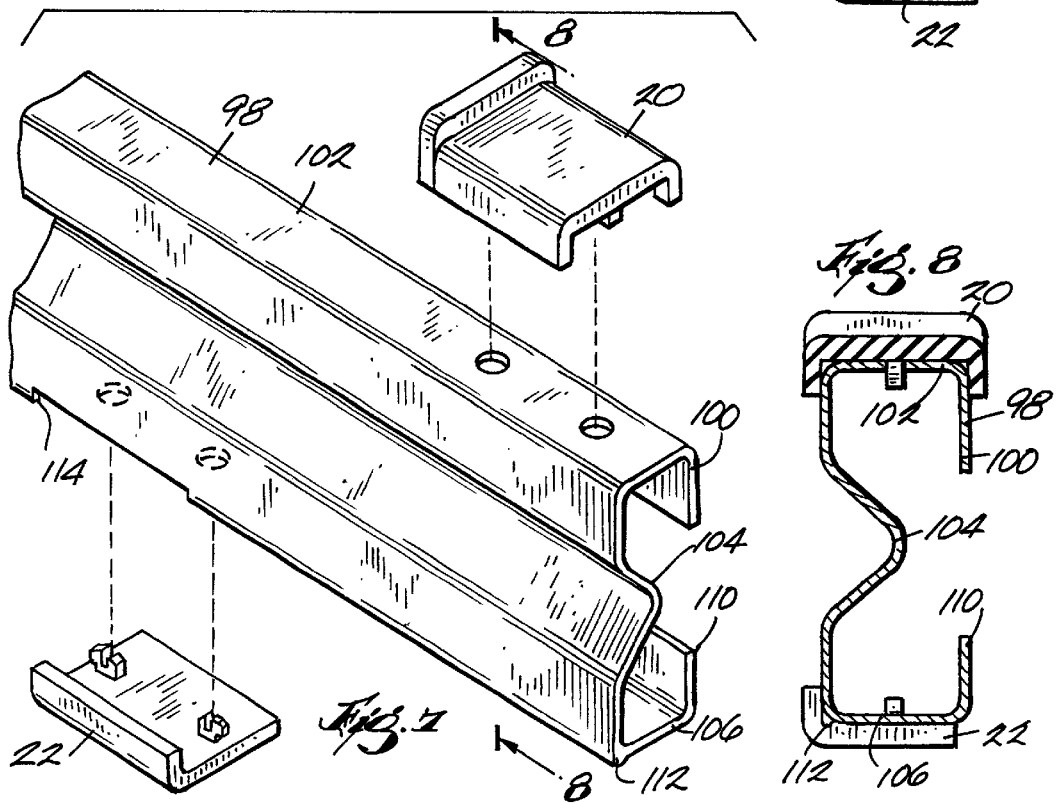

WEAR SHOE FOR SLUDGE COLLECTOR

FIELD OF THE INVENTION

The invention relates to a sludge collector for treating wastewater, and more particularly, to a wear shoe for use with the flights of a sludge collector.

BACKGROUND OF THE INVENTION

Sludge collectors are commonly used in wastewater treatment plants to scrape settled sludge from the bottom of a settling tank and to skim floating waste off the surface of the wastewater. The settling tank is typically made of concrete with support tracks or rails in the bottom or floor of the tank and support tracks or rails on the side walls of the tank. The sludge collectors typically include a number of flights which are usually elongated members that extend the width of the tank. The flights are typically pultruded fiberglass in various profiles.

The flights are connected at each of their opposite ends to conveyor chains which carry the flights in a circuit along the bottom of the tank to perform the scraping operation and over the surface of the wastewater to perform the skimming operation. As the flights move along the bottom of the tank, the flights are supported by the rails extending along the tank bottom. As the flights move along the surface of the tank, the ends of the flights are supported by the rails mounted on the side walls of the tank.

The portions of the flights which engage the rails at the bottom and side walls of the tank are subject to wear. To minimize this wear, wear shoes are attached to the flights where the flights contact the rails to thereby protect the flights. Typically, wear shoes are attached to the flights with bolts or other fasteners. However, fasteners are subject to corrosion from exposure to the wastewater, making removal and replacement of worn shoes difficult.

Flights most often have a channel shape in cross-section. Wear shoes for this type of flight generally have a simple L-shape with two holes drilled in each leg of the wear shoe, allowing the wear shoe to be reversed after wear has occurred on one leg. In practice, however, most users simply discard the wear shoe without reversing it. This type of wear shoe is mechanically fastened with bolts and locknuts to the flights. In order to save on hardware, wear shoes can be bolted in-line with the chain attachment plates to utilize common mounting hardware. The hardware is often specified as 304 or 316 stainless steel due to corrosion. Therefore, the cost of flight assembly hardware can be very expensive and can become a significant portion of the overall product cost.

Other prior art wear shoes are available which eliminate the need for mechanical fasteners. These wear shoes allow for manual attachment of the wear shoes onto the flights. However, these prior art wear shoes are useable with only a single flight configuration, a flight having specialized ramps, flanges or protrusions. These designs also rely upon the flexing ability of the flight to allow the wear shoe to be installed.

SUMMARY OF THE INVENTION

The present invention includes a wear shoe that includes a flexible self-locking member rather than utilizing a flight with a cooperating profile, or rather than relying upon flexing of the flight. The wear shoe snaps into the flight and is able to be utilized with any currently available channel-type flight configuration.

The wear shoe design shown herein provides for the ability to mount the wear shoe to a channel type flight via simple drilling of at least one bore in the flight. For example, the prior art L-shaped wear shoes cannot be used with flights having a diamond configuration. However, by utilizing the wear shoe of the present invention which mounts on a surface of the flight, this problem is eliminated. This wear shoe design also allows the wear shoe to be located anywhere along the flight's length, eliminating the need to be lined up with the chain mounting attachment or any other hardware.

One wear shoe is described herein that is designed to contact the side rails of the settling tank and another wear show is described herein that is designed to contact the floor rails of the tank.

Other features and advantages of the invention will become apparent to those of ordinary skill in the art upon review of the following detailed description, claims, and drawings.

BRIEF DESCRIPTION OF THE DRAWINGS

FIG. 1 is a perspective view of two wear shoes embodying the invention and a corresponding flight having a first configuration;

FIG. 2 is a view taken along line 2—2 of FIG. 1;

FIG. 3 is a perspective view of the wear shoes and a corresponding flight having a second configuration;

FIG. 4 is a view taken along line 4—4 of FIG. 3;

FIG. 5 is a perspective view of the wear shoes and a corresponding flight having a third configuration;

FIG. 6 is a view taken along line 6—6 of FIG. 5;

FIG. 7 is a perspective view of the wear shoes and a corresponding flight having a fourth configuration;

FIG. 8 is a view taken along line 8—8 of FIG. 7;

Figure 10:
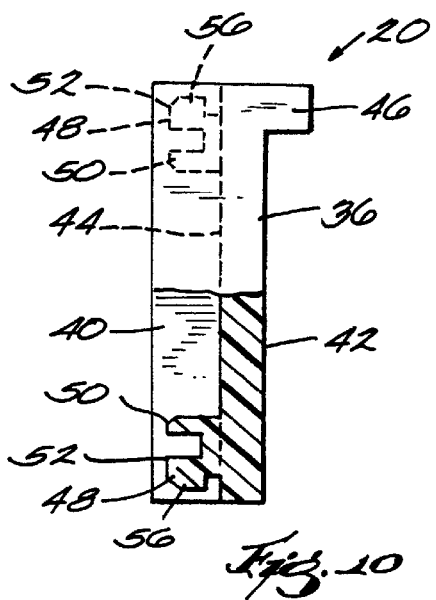
FIG. 10 is a partial sectional view of another embodiment of the wear shoe.
Figure 9:
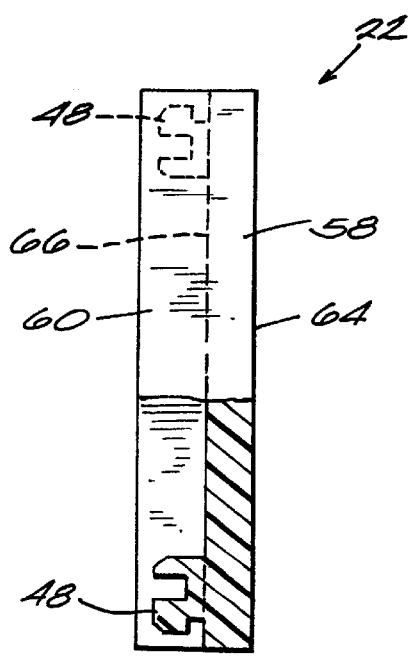
FIG. 9 is a partial sectional view of one embodiment of the wear shoe.

Before one embodiment of the invention is explained in detail, it is to be understood that the invention is not limited in its application to the details of construction and the arrangement of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE PREFERRED EMBODIMENT

Referring now to the drawings, there is shown in FIGS. 1 and 2 a pair of wear shoes 20 and 22 and a corresponding flight 24. The flight 24 is of the C-shape configuration which includes a first leg 26, a web 28, a second leg 30 and a lip 32. The lip 32 runs the length of the web 28 except for a portion 34 of the web 28 wherein the lip 32 is removed as will be described later. The lip 32 is designed to reduce the gap between the bottom of the tank and the flight to minimize solids build up on the floor of the tank.

The wear shoe 20 is designed to be mounted onto a surface of the flight 24, such as the first leg 26. It is the wear shoe 20 that contacts the rails on the side walls of the tank. With reference to FIGS. 1, 2 and 10, the wear shoe 20 is a unitary piece and preferably molded of a plastic such as polyurethane or ultra-high molecular weight (UHMW) polyethylene. However, it should be noted that the wear shoe 20 could be fabricated of other materials.

The wear shoe 20 can be L-shaped in cross-section, as shown in FIG. 1 and including a central web 36 and a first leg 38, or can be C-shaped cross-section, as shown in FIG. 3, and defined by a central web 36, a first leg 38 and a second leg 40. The web 36 has a first surface 42 and a second surface 44. It is the surface 42 that is the wear surface which engages the side rails of the tank. A flange 46 extends outwardly from the first surface 42 and acts as a guide as the wear shoe 20 travels along the rails on the side of the tank.

As best shown in FIG. 10, a pair of resilient locking members 48 extend outwardly from the second surface 44. Each locking member 48 preferably has a first resilient leg 50 and a second resilient leg 52. A shoulder portion 56 extends outwardly from the second leg 52. However, it should be noted that the locking members 48 could have various other configurations and still perform the same function.

Turning now to the other wear shoe 22, this wear shoe 22 is designed to be mounted onto a surface of the flight 24, such as the second leg 30. It is the wear shoe 22 that is designed to contact the floor rails of the tank. With reference to FIGS. 1, 2 and 11, the wear shoe 22 is a unitary piece and preferably molded of a plastic such as polyurethane or ultra-high molecular weight (UHMW) polyethylene. However, it should be noted that the wear shoe 22 could be fabricated of other materials.

The wear shoe 22 is generally L-shaped in cross-section and is defined by a central web 58 and a first leg 60. The web 58 has a first surface 64 and a second surface 66. It is the surface 64 that is the wear surface which engages the floor rails on the bottom of the tank. The leg 60 extends outwardly from the second surface 66. A pair of resilient locking members 48, as described above with respect to wear shoe 20, extend outwardly from the second surface 66.

It should be noted that the dimensions and materials from which the wear shoes 20 and 22 are fabricated may vary. For example, the length, depth and width of the wear shoe 20 which contacts the side rails of the tank may vary from the length, depth and width of the wear show 22 that contacts the floor rails of the tank.

Turning now to the installation of the wear shoe 20 and FIGS. 1 and 2, the wear shoe 20 does not utilize any mounting hardware separate from the wear shoe itself nor does the wear shoe 20 have to be mounted onto the flight 24 at a predetermined location. Rather, the wear shoe 20 can be mounted to the flight 24 at a location chosen by the user based upon a given application.

When a desired location for installation of the wear shoe 20 has been determined, two bores 68 are made through the first leg 26 of the flight 24, such as by drilling. The diameter of the bores 68 corresponds to the dimensions of the locking members 48, respectively as will become clear hereafter. The wear shoe 20 is then aligned with the bores 68 such that one locking member 48 is aligned with each bore 68 as is shown in FIG. 1. In this alignment, the web 36 and the leg 26 are generally parallel and the leg 38 and the web 28 are generally parallel.

After alignment, the wear shoe 20 is manually lowered such that each locking member 48 enters a respective bore 68. Further downward forcible movement temporarily deforms the legs 50 and 52 of each locking member 48 allowing the legs 50 and 52 to pass through the respective bore 68. At the point where the shoulder portion 56 clears the bore 68, the legs 50 and 52 snap back to their original orientation. In this position, the shoulder portion 56 of each locking member 48 prevents the wear shoe 20 from moving relative to the flight 24, as is particularly shown in FIG. 2.

The installation of the other wear shoe 22 is similar to that described above with respect to the wear shoe 20. However, the wear shoe 22 needs to be mounted on the flight 24 in the portion 34 in which the lip 32 has been removed, such as by cutting.

Removal of the wear shoes 20 and 22 from the respective flight 24 can be accomplished either by prying thereby causing deformation of the locking members 48 until they clear the bore 68 or by removal of the locking members 48 from the surface 44 or 66 of the respective wear shoe 20 or 22.

An advantage of the design of the wear shoes 20 and 22 is that they can be utilized with many different configurations of channel type flights as is shown in FIGS. 3–8 and described as follows.

Referring now to FIGS. 3 and 4, the wear shoes 20 and 22 and a corresponding flight 70 are shown. The flight 70 is of a Sigma Plus™ configuration which includes a first leg 72, a second leg 74, a non-planar web 76, a third leg 78 and a lip 80. The lip 80 runs the length of the web 76 except for a portion 82 of the web 76 where it is removed for installation of the wear shoe 22. The wear shoe 20 is mounted onto a surface of the flight such as the second leg 74 and the wear shoe 22 is mounted onto a surface of the flight such as the third leg 78.

Referring now to FIGS. 5 and 6, the wear shoes 20 and 22 and a corresponding flight 84 are shown. The flight 84 is of a diamond configuration which includes a first leg 86, a second leg 88, a non-planar web 90, a third leg 92 and a lip 94. The lip 94 runs the length of the web 90 except for a portion 96 of the web 90 where it is removed for installation of the wear shoe 22. The wear shoe 20 is mounted onto a surface of the flight such as the second leg 88 and the wear shoe 22 is mounted onto a surface of the flight such as the third leg 92.

Referring now to FIGS. 7 and 8, the wear shoes 20 and 22 and a corresponding flight 98 are shown. The flight 98 is of the Sigma™ configuration which includes a first leg 100, a second leg 102, a non-planar web 104, a third leg 106, a fourth leg 110 and a lip 112. The lip 112 runs the length of the web 104 except for a portion 114 of the web 104 where it is removed for installation of the wear shoe 22. The wear shoe 20 is mounted onto a surface of the flight such as the second leg 102 and the wear show 22 is mounted onto a surface of the flight such as the third leg 106.

As can be appreciated from the description herein, the wear shoes 20 and 22 utilize themselves as both the flexing member, rather than the flight, and the self-locking member, rather than additional hardware or fasteners or specialized portions of the flight. With use of the wear shoes 20 and 22, one does not have to rely upon the flexing of a flight or any specific configuration of the flight such as ramps, lead-ins, or projections. The wear shoes 20 and 22 of the present invention snap onto a surface of a flight.

The wear shoes 20 and 22 have the ability to be mounted to any channel-type flight configuration. This versatility is possible because the wear shoes 20 and 22 mount to a surface of a given flight simply by drilling holes into the surface at desired locations and snapping the wear shoes 20 or 22 into place. With the ability of the wear shoes 20 and 22 to be located any where along a flight's length, this eliminates the prior need to align with any chain mounting attachment and eliminates mounting hardware or additional fasteners.

I claim:

1. An elongated collector flight assembly for use in a wastewater treatment tank, the wastewater treatment tank having a flight supporting surface, and the collector flight assembly comprising:

an elongated collector flight adapted to extend across the wastewater treatment tank and to be moved along the tank, the elongated collector flight including a bore, a wear shoe secured to the elongated collector flight for sliding engagement with the flight supporting surface, the wear shoe including a wear plate portion having a wear surface for slidably engaging the flight supporting surface and having an opposite surface engaging the flight, and the wear shoe including a locking member integral with the wear plate portion and projecting from said opposite surface into said bore to secure the wear shoe to the collector flight in snap fit relation, the locking member including a pair of spaced apart resilient legs, the resilient legs being adapted to resiliently move together when the locking member is forced into the bore and to grippingly engage the bore.

2. An elongated collector flight as set forth in claim 1, wherein the collector flight includes an elongated channel having an upper leg including a contact surface for engaging the flight supporting surface of the tank, a lower leg and a web joining the upper leg and the lower leg, and wherein the bore extends through the contact surface and the upper leg.

3. A wear shoe for use with a collector flight in a wastewater treatment tank, the collector flight extending across the wastewater treatment tank and adapted to move along the tank with the collector flight slidably supported at its opposite ends by flight supporting surfaces of the tank, and the collector flight having a bore, the wear shoe comprising:

a wear plate portion having a wear surface for slidably engaging one of said flight supporting surfaces of the tank and having an opposite surface engaging the collector flight, and the wear shoe including a locking member integral with the wear plate portion and projecting from said opposite surface into said bore to secure the wear shoe to the collector flight in snap fit relation, the locking member including a pair of spaced apart resilient legs, the resilient legs being adapted to resiliently move together when the locking member is forced into the bore and to grippingly engage the bore.

4. A wear shoe as set forth in claim 3, wherein an elongated collector flight includes an elongated channel having an upper leg including a contact surface for engaging the collector flight supporting surface of the tank, a lower leg and a web joining the upper leg and the lower leg, and wherein the bore extends through the contact surface and the upper leg.

5. An elongated collector flight assembly for use in a wastewater treatment tank, the wastewater treatment tank having a flight supporting surface, and the collector flight assembly comprising:

an elongated collector flight adapted to extend across the wastewater treatment tank and to be moved along the tank, the elongated collector flight including a cylindrical bore, a wear shoe secured to the elongated collector flight for sliding engagement with the flight supporting surface, the wear shoe including a wear plate portion having a wear surface for slidably engaging the flight supporting surface and having an opposite surface engaging the flight, and the wear shoe including a resilient locking member integral with the wear plate portion and projecting from said opposite surface into said cylindrical bore to secure the wear shoe to the collector flight in snap fit relation, the wear shoe including a web and forming the wear plate portion at least one resilient leg extending from said opposite surface and being adapted to resiliently move when the locking member is forced into the cylindrical bore and to grippingly engage the bore.

* * * * *